(12) United States Patent
Ranka et al.

(10) Patent No.: US 8,349,065 B2
(45) Date of Patent: Jan. 8, 2013

(54) ASPHALT-MINERAL COMPOSITIONS

(75) Inventors: Ajay Ranka, Gujarat (IN); Prakash Mehta, Gujarat (IN)

(73) Assignee: Zydex Industries, Vadodara, Gujarat (IN)

( * ) Notice: Subject to any disclaimer, the term of this patent is extended or adjusted under 35 U.S.C. 154(b) by 559 days.

(21) Appl. No.: 12/638,596

(22) Filed: Dec. 15, 2009

(65) Prior Publication Data

US 2010/0159761 A1 Jun. 24, 2010

(51) Int. Cl.
*C08L 95/00* (2006.01)
*C09D 195/00* (2006.01)

(52) U.S. Cl. ............. 106/273.1; 106/284.06; 106/284.1; 106/284.4; 106/277; 106/282; 516/9; 516/38; 442/59; 428/221; 428/292.1

(58) Field of Classification Search ............... 106/273.1, 106/277, 284.06, 284.4, 284.1; 516/9, 38; 442/59; 428/221, 292.1
See application file for complete search history.

(56) References Cited

U.S. PATENT DOCUMENTS

| | | | |
|---|---|---|---|
| 2,570,185 A | 10/1951 | Aldrich | |
| 2,985,678 A | 5/1961 | Chappelow, Jr. et al. | |
| 4,036,661 A | 7/1977 | Schmidt et al. | |
| 4,038,096 A | 7/1977 | Graf et al. | |
| 4,170,484 A | 10/1979 | Crawford et al. | |
| 4,292,371 A * | 9/1981 | Marzocchi et al. | 428/378 |
| 4,349,388 A * | 9/1982 | Marzocchi et al. | 428/391 |
| 5,130,354 A | 7/1992 | Gelles | |

FOREIGN PATENT DOCUMENTS

DE 800685 11/1950

OTHER PUBLICATIONS

Sanderson, F.C., "Methylchlorosilanes as Anti-stripping Agents", Highway Research Board, 31, 288 (1952).

* cited by examiner

*Primary Examiner* — David M Brunsman
(74) *Attorney, Agent, or Firm* — Alston & Bird LLP (57) ABSTRACT

The present invention is related to asphalt and asphalt-mineral compositions including at least one cationic organosilicon compound selected from a group consisting of:

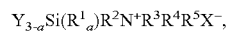

$Y_{3-a}Si(R^1_a)R^2N^+R^3R^4R^5X^-$,

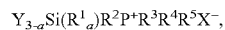

$Y_{3-a}Si(R^1_a)R^2P^+R^3R^4R^5X^-$,

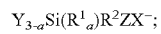

$Y_{3-a}Si(R^1_a)R^2ZX^-$;

or mixtures thereof,
wherein in each formula
Y is independently selected from a group consisting of OR, $O(CH_2CH_2O)_nH$, $(CH_3OCH_2CH_2O)$, and $(CH_3CH_2OCH_2CH_2O)$;
a has a value selected from 0, 1 or 2;
n is a value from 1 to 10;
R is C1-C4 alkyl;
$R^1$ is either methyl or ethyl;
$R^2$ is C1-C4 alkylene group;
$R^3$, $R^4$ and $R^5$ are each independently selected from a group consisting of C1-C22 alkyl wherein at least one such group has more than 8 C-atoms, $-CH_2C_6H_5$, $-CH_2CH_2OH$, $-CH_2OH$ and $-(CH_2)_yNHC(O)R^6$ wherein y has a value of from 2 to 10 and $R^6$ is a C1-C12 perfluoroalkyl radical;
X is chloride, bromide, fluoride, iodide, acetate or tosylate; and
Z is pyridinium ring of formula $C_5H_5N^+$.

15 Claims, 6 Drawing Sheets

ASPHALT-MINERAL COMPOSITIONS

CROSS-REFERENCE TO RELATED APPLICATIONS

This application claims priority to Indian Application No. 2657/MUM/2008, filed Dec. 9, 2008 and International Application No. PCT/IN2009/000712 filed on Dec. 9, 2009, both of which are hereby incorporated herein in their entirety by reference.

FIELD OF INVENTION

The present invention relates to asphalt and asphalt-mineral compositions suitable for paving or surfacing constructions. The compositions include at least one cationic organosilicon compound and exhibit improved adhesion of asphalt binder to aggregates.

BACKGROUND OF THE INVENTION

Asphalt is a common material utilized for the preparation of paving and roofing materials. A wide variety of compounds have been added to asphalt surfacing compositions in an attempt to improve the adhesion/wetting of the asphalt to the aggregate.

A wide variety of silicon compounds including silanes have been used for the impregnation and surface treatment of glass fibers to promote the adhesion of various organic resins such as the polyester resins, epoxide resins or phenol formaldehyde resins and for the surface treatment of textiles, leathers, ceramics and glass materials.

It has been found that the adhesion of asphalt to siliceous surfaces could be markedly improved by first treating the surfaces with vapors of a mixture of methylchlorosilanes. However, this exotic method of applying silanes to the aggregate surface is not practical in large scale applications. Sanderson, F. C., "Methylchlorosilanes as Anti-stripping Agents". Proceedings, Highway Research Board, 31, 288 (1952).

U.S. Pat. No. 2,570,185 discloses that the coating properties and anti-stripping properties of asphalt is improved by addition of the reaction product of aminoalkoxysilanes and high molecular weight aliphatic primary amines containing at least 6 carbon atoms to asphalt. The only example of a silane shown in U.S. Pat. No. 2,570,185 is di-t-butoxy-diamino silane. U.S. Pat. No. 2,985,678 discloses that higher alkyl or aryl radicals in silicon compounds progressively lower the stability of the compounds. However, the tertiary butyl radical is shown to increase the stability of the silicon compounds, even in silicon compounds which contain long chain alkyl such as a lauryl group.

German Patent No. 800,685 teaches silanes of the formula $SiR_mX_n$ as asphalt adhesion agents, wherein X represents a halogen or an alkoxy, R represents an organic residue and m and n represent integers of from 1 to 3. Specific examples of R include methyl, phenyl and 2-chloroethylene. U.S. Pat. No. 4,036,661 discloses using a variety of organofunctional silanes as adhesion promoters for asphalt-mineral compositions. U.S. Pat. No. 5,130,354 discloses using silane functionalized polymers as adhesion promoters for asphalt concrete mixtures for paving. U.S. Pat. Nos. 4,170,484 and 4,038,096 disclose using silanes to improve adhesion of asphalt binders to mineral aggregate.

The thermal stability of silicon compounds, however, is also of primary importance. That is, it is highly desirable that the compounds not only promote the adhesion of asphalt to mineral aggregate but also remain stable over a wide temperatures range and for an extended period of time. In addition to this, it is highly desirable that the adhesion promoters be capable of being used without exotic application methods. To be suitable for paving materials, the asphalt-silicon compound mixtures should be mixable in asphalt and stay mixed during subsequent processing. The compound must be stable to oxidation during processing and during long term aging due to weathering. Stability at temperature over 180° C. of silicon compound modified asphalt is a major consideration. Lower vapour pressure, higher boiling point and oxidative stability at 150° C.-180° C. are important for improved performance.

One drawback of using organosilanes is their inability to exhaust and react completely with the surfaces of aggregates if mixed with asphalt. As such, pre-treatment of aggregates with a silane is always required to achieve the desired efficacy of the adhesion promoters. Pre-treatment of aggregates is not practical and is very expensive to practice.

In addition to silanes, long chain tertiary amines and quaternary amines have traditionally been used as additives in asphalt to improve the adhesion of asphalt concrete. These products perform adequately at 0.5%-3% by weight of the asphalt. These compounds, however, have the disadvantage of increasing rutting and have poor fatigue resistance and function by mechanism of wetting and physical bonding. Additionally, due to availability and sustainability issues and the need to minimize consumption and increasing lack of good quality of aggregates and asphalt, there remains a need for asphalt-mineral compositions that have further improved adhesion and/or reduced susceptibility to moisture.

SUMMARY OF INVENTION

The present invention satisfies at least some of the aforementioned needs by providing asphalt compositions and asphalt-mineral compositions that have improved adhesion between the asphalt and the aggregate. The asphalt compositions and the asphalt-mineral compositions include at least one cationic organosilicon compound. The cationic organosilicon compound is preferably present in the compositions ranging from 0.001 to 5% by weight of the asphalt.

In one aspect, the present invention provides an asphalt composition that includes at least one cationic organosilicon compound intermixed with asphalt. The asphalt compositions exhibit improved adherence to a wide variety of aggregates. In certain embodiments, the cationic organosilicon compound has a formula selected from the group consisting of:

or mixtures thereof,
wherein in each formula:
Y is independently selected from a group consisting of OR, O(CH$_2$CH$_2$O)$_n$H, (CH$_3$OCH$_2$CH$_2$O), and (CH$_3$CH$_2$OCH$_2$CH$_2$O);
a has a value selected from 0, 1 or 2;
n is 1, 2, 3, 4, 5, 6, 7, 8, 9 or 10;
R is C1-C4 alkyl;
R$^1$ is either methyl or ethyl;
R$^2$ is C1-C4 alkylene group;
R$^3$, R$^4$ and R$^5$ are each independently selected from a group consisting of C1-C22 alkyl wherein at least one such group has more than 8 C-atoms, —CH$_2$C$_6$H$_5$,

—$CH_2CH_2OH$, —$CH_2OH$ and —$(CH_2)_yNHC(O)R^6$ wherein y has a value of from 2 to 10 and $R^6$ is a C1-C12 perfluoroalkyl radical;

X is chloride, bromide, fluoride, iodide, acetate or tosylate; and

Z is pyridinium ring of formula $C_5H_5N^+$.

In another aspect, the present invention provides asphalt-mineral compositions that include mineral aggregate, an asphalt, and at least one cationic organosilicon compound. In one embodiment, the asphalt-mineral compositions include 100 parts by weight of a mineral aggregate, 3 to 20 parts by weight of an asphalt, and from 0.001 to 5% by weight of at least one cationic organosilicon compound on the weight of the asphalt. In certain embodiments, the cationic organosilicon compound present in the asphalt-mineral composition is selected from the group consisting of:

or mixtures thereof,
wherein in each formula

Y is independently selected from a group consisting of OR, $O(CH_2CH_2O)_nH$, $(CH_3OCH_2CH_2O)$, and $(CH_3CH_2OCH_2CH_2O)$;

a has a value selected from 0, 1 or 2;

n is 1, 2, 3, 4, 5, 6, 7, 8, 9, or 10;

R is C1-C4 alkyl;

$R^1$ is either methyl or ethyl;

$R^2$ is C1-C4 alkylene group;

$R^3$, $R^4$ and $R^5$ are each independently selected from a group consisting of C1-C22 alkyl wherein at least one such group has more than 8 C-atoms, —$CH_2C_6H_5$, —$CH_2CH_2OH$, —$CH_2OH$ and —$(CH_2)_yNHC(O)R^6$ wherein y has a value of from 2 to 10 and $R^6$ is a C1-C12 perfluoroalkyl radical;

X is chloride, bromide, fluoride, iodide, acetate or tosylate; and

Z is pyridinium ring of formula $C_5H_5N^+$.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Asphalts are customarily used in paving constructions as a glue or binder for aggregate particles. That is, the asphalt is used to coat and bind aggregate particles together. These thermoplastic-like materials which soften when heated and harden upon cooling also exhibit viscoelastic properties (e.g., exhibit the mechanical characteristics of viscous flow and elastic deformation) over a certain temperature range.

Asphalts, however, are highly complex and not well-characterized materials containing a variety of saturated and unsaturated aliphatic and aromatic compounds. These compounds can often include up to 150 carbon atoms. Particular asphalt compositions vary depending on the source of crude oil. Many of the compounds contain oxygen, nitrogen, sulfur, and other heteroatoms. Asphalt typically contains about 80% by weight of carbon; around 10% hydrogen; up to 6% sulfur; small amounts of oxygen and nitrogen; and trace amounts of metals such as iron, nickel, and vanadium. The molecular weights of the constituent compounds range from several hundred to many thousands.

A wide variety of asphalts may be used to prepare the asphalt and asphalt-mineral compositions according to the present invention. In general, any paving grade asphaltic binder satisfactory for preparing paving compositions is contemplated as being useful. Paving grade asphalts can have a wide range of penetration values ranging from as low as 30 or 40 dmm for the harder asphalts to 200 to 300 dmm at 25° C. (100 g, sec.) for the softer asphalts. The most widely used paving asphalts according to embodiments of the present invention generally have a penetration at 25° C. of about 60 to 100 dmm (e.g., 60-70, 70-80, or 80-100 dmm). In preferred embodiments, however, the asphalt remains viscoelastic in all weather conditions.

In certain embodiments of the present invention, the asphalt can include bitumen, natural asphalt, oil residue of paving grade, plastic residue from coal tar distillation, petroleum pitch and coal tar.

Adhesion promoters are additives or modifiers used to improve the adhesion (e.g., resistance to stripping) to aggregates. The adhesion promoters according to the present invention are cationic organosilicon compounds according to the following formulae:

or mixtures thereof,
wherein in each formula

Y is independently selected from a group consisting of OR, $O(CH_2CH_2O)_nH$, $(CH_3OCH_2CH_2O)$, and $(CH_3CH_2OCH_2CH_2O)$;

a has a value selected from 0, 1 or 2;

n is a value from 1 to 10 (e.g., 1, 2, 3, 4, 5, 6, 7, 8, 9, 10);

R is C1-C4 alkyl;

$R^1$ is either methyl or ethyl;

$R^2$ is C1-C4 alkylene group;

$R^3$, $R^4$ and $R^5$ are each independently selected from a group consisting of C1-C22 alkyl wherein at least one such group has more than 8 C-atoms, —$CH_2C_6H_5$, —$CH_2CH_2OH$, —$CH_2OH$ and —$(CH_2)_yNHC(O)R^6$ wherein y has a value of from 2 to 10 and $R^6$ is a C1-C12 perfluoroalkyl radical;

X is chloride, bromide, fluoride, iodide, acetate or tosylate; and

Z is pyridinium ring of formula $C_5H_5N^+$.

Aggregates or mineral aggregates are coarse particulate materials used in construction, including sand, gravel, crushed stone, soil, slag, recycled concrete, or mixtures thereof. Mineral fillers are also aggregates which typically include dolomite, granites, river-bed crushed gravel, sandstone, limestone, basalt and other inorganic stones which can be added to the system.

The particular aggregates, sand, soils etc. used to form the asphalt-mineral compositions of the present invention are not critical as long as they have functional groups or reactive sites (e.g., silanol groups) on the surface that will bond with the silanols created by hydrolysis of the silane alkoxy groups.

In one aspect, the present invention provides asphalt compositions that can be coated onto a variety of aggregates to bind them together. Asphalt compositions according to embodiments of the present invention exhibit improved adhesion to a wide variety of aggregate particles. That is, the quantity of the asphalt compositions, according to embodiments of the present invention, retained on the surface of aggregates after repeated exposure or immersion in water is significantly increased due to the incorporation of a cationic ionic organosilicon compound according to embodiments of the present invention.

In certain embodiments, the asphalt compositions include an asphalt and from 0.001 to 5% by weight of at least one cationic organosilicon compound based on the weight of the asphalt. In one embodiment, the cationic organosilicon compound is selected from the following formulae:

$$Y_{3-a}Si(R^1_a)R^2N^+R^3R^4R^5X^-,$$

$$Y_{3-a}Si(R^1_a)R^2P^+R^3R^4R^5X^-, \text{ and}$$

$$Y_{3-a}Si(R^1_a)R^2ZX^-;$$

or mixtures thereof,
wherein in each formula
  Y is independently selected from a group consisting of OR, $O(CH_2CH_2O)_nH$, $(CH_3OCH_2CH_2O)$, and $(CH_3CH_2OCH_2CH_2O)$;
  a has a value selected from 0, 1 or 2;
  n can have any value from 1 to 10;
  R is C1-C4 alkyl;
  $R^1$ is either methyl or ethyl;
  $R^2$ is C1-C4 alkylene group;
  $R^3$, $R^4$ and $R^5$ are each independently selected from a group consisting of C1-C22 alkyl wherein at least one such group has more than 8 C-atoms, —$CH_2C_6H_5$, —$CH_2CH_2OH$, —$CH_2OH$ and —$(CH_2)_yNHC(O)R^6$ wherein y has a value of from 2 to 10 and $R^6$ is a C1-C12 perfluoroalkyl radical;
  X is chloride, bromide, fluoride, iodide, acetate or tosylate; and
  Z is pyridinium ring of formula $C_5H_5N^+$.

In other embodiments, the asphalt compositions include from 0.01 to 5%, or from 0.01 to 3% by weight, or from 0.02 to 1% by weight of at least one cationic organosilicon compound based on the weight of the asphalt. In one embodiment, the asphalt compositions include from 0.02 to 0.1% by weight of at least one cationic organosilicon compound based on the weight of the asphalt.

In another aspect, the present invention provides an asphalt-mineral composition including a mineral aggregate, asphalt, and a cationic organosilicon compound. In one embodiment, the composition includes 100 parts by weight of a mineral aggregate and 3 to 20 parts by weight of asphalt comprising from 0.001 to 5% by weight of at least one cationic organosilicon compound based on the weight of the asphalt. In certain embodiments, the cationic organosilicon compound in the composition is selected from a group consisting of:

$$Y_{3-a}Si(R^1_a)R^2N^+R^3R^4R^5X^-,$$

$$Y_{3-a}Si(R^1_a)R^2P^+R^3R^4R^5X^-, \text{ and}$$

$$Y_{3-a}Si(R^1_a)R^2ZX^-;$$

or mixtures thereof,
wherein in each formula
  Y is independently selected from a group consisting of OR, $O(CH_2CH_2O)_nH$, $(CH_3OCH_2CH_2O)$, and $(CH_3CH_2OCH_2CH_2O)$;
  a has a value selected from 0, 1 or 2;
  n is any value selected from 1 to 10;
  R is C1-C4 alkyl;
  $R^1$ is either methyl or ethyl;
  $R^2$ is C1-C4 alkylene group;
  $R^3$, $R^4$ and $R^5$ are each independently selected from a group consisting of C1-C22 alkyl wherein at least one such group has more than 8 C-atoms, —$CH_2C_6H_5$, —$CH_2CH_2OH$, —$CH_2OH$ and —$(CH_2)_yNHC(O)R^6$ wherein y has a value of from 2 to 10 and $R^6$ is a C1-C12 perfluoroalkyl radical;
  X is chloride, bromide, fluoride, iodide, acetate or tosylate; and
  Z is pyridinium ring of formula $C_5H_5N^+$.

In one preferred embodiment, the cationic organosilicon compound is of the formula:

$$Y_{3-a}Si(R^1_a)R^2N^+R^3R^4R^5X^-,$$

wherein in each formula,
  Y is independently selected from a group consisting of OR, $O(CH_2CH_2O)_nH$, $(CH_3OCH_2CH_2O)$, and $(CH_3CH_2OCH_2CH_2O)$;
  a has a value selected from 0, 1 or 2;
  n is any value selected from 1 to 10;
  R is C1-C4 alkyl;
  $R^1$ is either methyl or ethyl;
  $R^2$ is C1-C4 alkylene group;
  $R^3$, $R^4$ and $R^5$ are each independently selected from a group consisting of C1-C22 alkyl wherein at least one such group has more than 8 C-atoms, —$CH_2C_6H_5$, —$CH_2CH_2OH$, —$CH_2OH$ and —$(CH_2)_yNHC(O)R^6$ wherein y has a value of from 2 to 10 and $R^6$ is a C1-C12 perfluoroalkyl radical; and
  X is chloride, bromide, fluoride, iodide, acetate or tosylate.

In another embodiment, $R^2$ in the following compounds:

$$Y_{3-a}Si(R^1_a)R^2N+R^3R^4R^5X^-,$$

$$Y_{3-a}Si(R^1_a)R^2P+R^3R^4R^5X^-, \text{ and}$$

$$Y_{3-a}Si(R^1_a)R^2ZX^-;$$

or mixtures thereof,
is a C4 alkylene group.

In yet another embodiment, the cationic organosilicon compound in the composition is at least one selected from 3-(trimethoxysilyl)propyldimethyloctadecyl ammonium chloride, 3-(trimethoxysilyl)propylmethyldidecyl ammonium chloride, 3-(trimethoxysilyl)propyldimethylhexadecyl ammonium chloride, and 3-[Dimethoxy(2-hydroxyethoxy) silyl]propyloctadecyldimethyl ammonium chloride.

The cationic organosilicon compounds are present in the surfacing composition (e.g., asphalt and asphalt-mineral compositions) in an amount effective to substantially increase the amount of asphalt retained on the aggregate's surfaces after the water immersion test described below. In general, the amount of cationic organosilicon compound necessary to substantially increase the retained asphalt coating the aggregate, sand, soil etc. after the stripping test ranges from about 0.001 parts to about 5 parts by weight per 100 parts of asphalt. Preferably, the cationic organosilicon compounds are present in amounts ranging from about 0.05 to about 0.1 parts by weight per 100 parts of asphalt.

The cationic organosilicon compounds can be introduced into the surfacing compositions (e.g., the asphalt and asphalt-mineral compositions) in a variety of ways during the manufacture thereof. For instance, the cationic organosilicon compounds can be added to molten asphalt or an asphalt emulsion as a preferred method prior to mixing with the aggregate. If desired for some reason, the cationic organosilicon compounds can be applied or coated on the surfaces of aggregates prior to mixing the asphalt and aggregates. Alternatively, the cationic organosilicon compounds can be added to a pre-mixed composition containing asphalt and aggregate.

In addition to the above mentioned ingredients, a number of other materials can be present according to certain embodiments of the present invention. These can include materials which affect the physical properties of the finished surface composition. In general, any additives which have typically been used to improve resulting surfacing compositions and which are compatible with the cationic organosilicon compound can be added to the compositions according to embodiments of the present invention.

In case of emulsified asphalts which can be anionic, cationic or non-ionic, cold mixes can be prepared by blending with fine aggregates, useful for slurry seal, micro surfacing, seal coating etc., for pavement preservation and repairs. In such cases, the cationic organosilicon compound is added to the emulsion prior to mixing with aggregates. The testing of the compatibility of proposed additives with the cationic organosilicon compounds, according to embodiments of the present invention, is straightforward and easily conducted. For instance, small samples can be prepared and tested for minimum emulsion stability for 12 to 24 hours.

In another aspect, the present invention provides a water-based asphalt composition including an emulsion comprising asphalt dispersed in water and from 0.001 to 5% by weight of at least one cationic organosilicon compound on the weight of the asphalt.

In preferred embodiments, the cationic organosilicon compound is selected from the group consisting of:

and mixtures thereof,
wherein in each formula
Y is independently selected from a group consisting of OR, $O(CH_2CH_2O)_nH$, $(CH_3OCH_2CH_2O)$, and $(CH_3CH_2OCH_2CH_2O)$;
a has a value selected from 0, 1 or 2;
n is a value from 1 to 10;
R is a C1-C4 alkyl;

$R^1$ is either methyl or ethyl;
$R^2$ is a C1-C4 alkylene group;
$R^3$, $R^4$ and $R^5$ are each independently selected from a group consisting of C1-C22 alkyl wherein at least one such group has more than 8 C-atoms, $-CH_2C_6H_5$, $-CH_2CH_2OH$, $-CH_2OH$ and $-(CH_2)_yNHC(O)R^6$ wherein y has a value of from 2 to 10 and $R^6$ is a C1-C12 perfluoroalkyl radical;
X is chloride, bromide, fluoride, iodide, acetate or tosylate; and
Z is pyridinium ring of formula $C_5H_5N^+$.

In certain embodiments, the water-based asphalt compositions can optionally also include one or more organic co-solvents. Suitable organic solvents should preferably not negatively impact the stability of the cationic organosilicon compounds in the composition. Suitable solvents can generally include, but are not necessarily limited to, alcohols (preferably glycols), ketones, ester based solvents and polar acetate solvents.

Examples of alcohols include methanol, ethanol, isopropanol and gylcols; examples of glycols that can be used according to certain embodiments of the present invention include, but are not limited to, ethylene glycol, propylene glycol, ether alcohols such as ethylene glycol, ethylene glycol monoethyl ether and ethylene glycol monobutyl ether; dialkyl ethers of ethylene, ethylene glycolmonoethyl ether, ethylene glycol monobutyl ether, ethylene glycol dibutyl ether, ethylene glycol monoethyl ether acetate, ethylene glycol monohexyl ether acetate, propylene glycol monoethyl ether, and propylene glycol dibutyl ether; the mono- and dialkylethers of diethylene glycol such as diethylene glycol monoethyl ether, diethylene glycol dibutyl ether, diethylene glycol diethyl ether, and diethylene glycol monobutyl ether acetate.

Examples of ketones that can be used according to certain embodiments of the present invention include, but are not limited to, acetone, acetophenone, butanone, cyclohexanone, ethyl isopropyl ketone, diacetone, isophorone, methyl isobutyl ketone, methyl isopropyl ketone, methylethyl ketone, methylamyl ketone, and 3-pentanone.

Examples of ester based solvents and acetate solvents that can be used according to certain embodiments of the present invention include, but are not limited to, benzyl benzoate, butyl acetate, methyl acetate, ethyl acetate, n-propyl acetate, isobutyl acetate, isoamyl acetate, isopropyl acetate, n-butyl acetate, isobutyl acetate, amyl acetate, sec-butyl acetate, tert-butyl acetate, ethyl acetate, ethyl acetoacetate, methyl acetate propyl acetate, ethylene glycol monomethyl ether acetate and ethylene glycol monoethyl ether acetate.

The present invention also provides a water-based asphalt-mineral composition including an emulsion comprising asphalt dispersed in water, at least one mineral aggregate, and from 0.001 to 5% by weight of at least one cationic organosilicon compound on the weight of the asphalt. Water-based asphalt-mineral compositions according to certain embodiments of the present invention can optionally also include one or more of the previously discussed organic solvents. In preferred embodiments, the cationic organosilicon compound is selected from the group consisting of:

and mixtures thereof, wherein in each formula
Y is independently selected from a group consisting of OR, $O(CH_2CH_2O)_nH$, $(CH_3OCH_2CH_2O)$, and $(CH_3CH_2OCH_2CH_2O)$;
a has a value selected from 0, 1 or 2;
n is a value from 1 to 10;
R is a C1-C4 alkyl;
$R^1$ is either methyl or ethyl;
$R^2$ is a C1-C4 alkylene group;
$R^3$, $R^4$ and $R^5$ are each independently selected from a group consisting of C1-C22 alkyl wherein at least one such group has more than 8 C-atoms, $—CH_2C_6H_5$, $—CH_2CH_2OH$, $—CH_2OH$ and $—(CH_2)_yNHC(O)R^6$ wherein y has a value of from 2 to 10 and $R^6$ is a C1-C12 perfluoroalkyl radical;
X is chloride, bromide, fluoride, iodide, acetate or tosylate; and
Z is pyridinium ring of formula $C_5H_5N^+$.

The water-based asphalt emulsions according to certain embodiments of the present invention comprise droplets or sheared particles of asphalt dispersed within water. Typically, the asphalt is maintained in a dispersed phase with the aid of known chemical stabilizers (e.g., emulsifiers). The water-based asphalt emulsions according to embodiments of the present invention can be provided by shearing molten asphalt into fine droplets in a high shear system, such as a colloidal mill. The asphalt can be brought into intimate contact with a chemical stabilizing solution according to embodiments of the present invention. Upon discharge from the mill, the emulsion comprises water with fine particles of asphalt dispersed therein.

Exemplary emulsifiers which can be used for asphalt-water systems (e.g., emulsions) according to embodiments of the present invention include, but are not limited to, octa-decyl amine, tallow amine, sodium lauryl sulphate, alkyl phenol ethoxylates such as nonyl phenol, octyl phenol condensates of ethylene oxide. According to certain embodiments, such emulsifiers (10 to 20 moles) can be used in preparing emulsions according to embodiments of the present invention to provide a stable emulsion. In certain embodiments, the emulsifier concentration can range from 0.2-2.0% on the weight of final emulsion or from 0.2-1.0%, or from 0.2-0.5% on the weight of the final emulsion.

A few benefits realized by utilizing water-based asphalt emulsions according to embodiments of the present invention include pollution control by eliminating the evaporation of typically used "cutback" materials (e.g., kerosene and gas oil fumes), enhanced safety because the compositions are not flammable or explosive, and ease of use. For instance, water-based asphalt emulsions according to embodiments of the present invention can simply be sprayed onto a surface for treatment or handled directly from a drum by pouring or spreading by hand or tool (e.g., shovel or baffle). Furthermore, since the emulsions are water-based, the aggregates do not need to be dry for application.

In certain embodiments, the asphalt-mineral compositions in either HMA (Hot Mix Asphalt) or emulsion form according to embodiments of the present invention are ideal for use as an asphalt membrane, for roofing shingles, or as underlayments. Various embodiments are ideal for use as a "cap sheet" and/or a "base sheet". "Cap sheets" have one surface exposed to the environment whereas "base sheets" are not intended to be exposed to the elements of the environment. Cap sheets or shingles are typically applied over the top of base sheets. Underlayments, which are typically reinforced with fibre-glass (for example), but can also have no reinforcing material, are more typically used under shingles.

In such embodiments, the composition can optionally include various polymeric and/or non-polymeric additives that are typically employed in such applications. For instance, a few polymers commonly used to modify asphalt include amorphous or atactic polypropylene (APP), amorphous poly-alphaolefin (APAO), thermoplastic polyolefin (TPO), styrene-butadiene-styrene (SBS), styrene-ethylene-butadiene-styrene (SEBS), synthetic rubber or other asphaltic modifiers that enhance the properties of asphalt. The incorporation of such modifiers into the asphalt widens its workable temperature range for roofing applications and results in improved mechanical and viscoelastic properties.

In another aspect, the present invention provides a roofing material comprised of a core that is saturated and/or coated with composition according to one or more embodiments of the present invention. The core is typically a reinforcing carrier or polymer fibre-reinforced mat made of non-woven, woven fabrics, or a combination of both as reinforcement. These mats can be made from inorganic fibres like glass or organic polymers like polyester, nylon, polyurethane, polypropylene, etc., or a combination of both inorganic and organic polymers.

Asphalt membranes according to embodiments of the present invention, preferably, exhibit a desirable degree of stretchability and structural strength. Such membranes can beneficially be used for waterproofing or water barrier applications. In such embodiments, the asphalt content is above 50% (e.g., 50-100%, or 50-90%, or 50-70%). In certain embodiments, the asphalt composition is above 60% (e.g., 60-100%, or 60-90%, or 60-70%), 70% (e.g., 70-100%, or 70-90%, or 70-80), 80% (e.g., 80-100%, or 80-90%), or 90% (e.g., 90-100% or 90-95%).

In yet another aspect, the present invention provides a "concentrate" composition that can be diluted out by addition of water or another desirable solvent (e.g., organic solvent if so desired). In one embodiment, the "concentrate" composition includes a cationic organosilicon compound according to the present invention in water. In such embodiments, the cationic organosilicon compound is typically present from about 0.01 to about 5.0% weight. In other embodiments, the present invention provides a "concentrate" composition having at least one cationic organosilicone compound in one or more organic solvents, preferably selected from the previously referenced solvents. Most preferably, the organic solvent is ethylene glycol. In other embodiments, the "concentrate" composition includes at least one cationic organosilicone compound in a mixture (e.g., miscible or liquid-liquid dispersion) of water and one or more organic solvents.

Beneficially, "concentrate" compositions according to embodiments of the present invention can be economically packaged, shipped, and/or stored without requiring a large holding volume or space. The "concentrate" compositions can be diluted with water, for example, at the time of application if so desired. Dilution ratios for a "concentrate" composition to water (or other solvent is desired) can range from 1 part "concentrate" composition to 250 parts water, or from 1 part "concentrate" to 200, 150, 100, 75, 50, 25, or 10 parts water (or other suitable solvent depending on the intended use). In one preferred embodiment, the "concentrate" composition comprises at least one cationic organosilicon compound in ethylene glycol. Preferably, the solids content of this embodiment ranges from about 35% to about 55%, or from about 40% to about 50%. The "concentrate" composition can be diluted with water (for example) to provide a diluted composition that can be used according to embodiments of the present invention.

EXAMPLES

Test of Asphalt-Aggregate Adhesion

Procedure for Sample Preparation and Water Immersion Testing (Stripping Resistance)

Surfacing compositions were prepared by mixing 3-5 parts of asphalt with 100 parts of aggregate or sand. Prior to mixing, both the asphalt and aggregate or sand were heated to 165° C. The mixture was cured for 15 minutes at 135° C. Following the prescribed cure, the samples were cooled and then subjected to a water immersion test. A variety of immersion conditions were investigated. These include a short exposure to 80° C. water from one hour to twenty four hours and longer exposures at 40° C. (1, 2 and 5 days). The percent asphalt coating remaining on the aggregate at completion of the water immersion test was rated visually on a scale of 0-100%. Ratings of below 95% retention of asphalt on the aggregates after the immersion test are considered poor/failed. In the following examples, all parts are by weight unless expressed otherwise.

Embodiments of the present invention will now be illustrated by working examples, which are intended to illustrate improved properties realized by embodiments of the present invention and should not be construed as impling any limitations on the scope of the present invention.

Example-1

Paving grade asphalt (60/70 penetration at 25° C.) samples were prepared to contain from 0.0% to 0.1% by weight of 3-[Dimethoxy(2-hydroxyethoxy)silyl]propyloctadecyldimethyl ammonium chloride (42% solution in ethylene glycol). 5 parts of these compounded asphalt compositions were mixed with 100 parts Igneous aggregates. The mixtures were cured for 15 minutes at 135° C. and then allowed to cool to room temperature. Water immersion tests (at 40° C. for 24 hours) were conducted. The results are shown in Table 1.

TABLE 1

|  | % Cationic organosilicon compound | | | | | |
|---|---|---|---|---|---|---|
|  | 0 | 0.02 | 0.04 | 0.06 | 0.08 | 0.1 |
| Adhesion % after 24 hours | 92 | 96 | 98 | 98.5 | 99 | 99 |

The results show significant improvement over asphalt without additive.

Example-2

Paving grade asphalt (60/70 penetration at 25° C.) samples were prepared to contain 0.0% (i.e., a control with no cationic organosilicon compound) and 0.08% by weight of 3-[Dimethoxy(2-hydroxyethoxy)silyl]propyloctadecyldimethyl ammonium chloride (42% solution in ethylene glycol). 5 parts of these compounded asphalt compositions were mixed with 100 parts Igneous aggregates. The mixtures were cured for 15 minutes at 135° C. and then allowed to cool to room temperature. Water immersion tests were conducted at 40° C. for five days. The results are given in the Table 2.

TABLE 2

|  | Days | | | | |
|---|---|---|---|---|---|
|  | 1 | 2 | 3 | 4 | 5 |
| Adhesion % control (i.e., no organosilicon) | 92 | 90 | 87 | 85 | 85 |
| Adhesion % with Cationic organosilcion compound | 99 | 98 | 98 | 98 | 98 |

Adhesion percentage ratings below 95% after the immersion test are considered poor/failed. As shown in Table 2, the composition including 0.08% by weight of 3-[Dimethoxy(2-hydroxyethoxy)silyl]propyloctadecyldimethyl ammonium chloride (42% solution in ethylene glycol) showed superior adhesion to the aggregates for all 5 days. Thus, these results clearly indicate significant improvement of asphalt adhesion to aggregates due to the addition of the cationic organosilicon compound.

Example-3

Paving grade asphalt (60/70 penetration at 25° C.) samples were prepared to contain 0.0% (i.e., a control with no cationic organosilicon compound) and 0.08% by weight of 3-[Trimethoxysilyl]propyloctadecyldimethyl ammonium chloride (42% solution in methanol). 5 parts of these compounded asphalt compositions were mixed with 100 parts igneous aggregates. The mixtures were cured for 15 minutes at 135° C. and then allowed to cool to room temperature after which water immersion tests were made at 40° C. for three days. The results are shown in Table 3.

TABLE 3

| Hours | 24 | 48 | 72 |
|---|---|---|---|
| Adhesion % control (i.e., no organosilicon compound) | 92 | 90 | 87 |
| Adhesion % with Cationic organosilicon compound | 99 | 98 | 98 |

Again, adhesion percentage ratings below 95% after the immersion test are considered poor/failed.

Example-4

Paving grade asphalt (60/70 penetration at 25° C.) samples were prepared to contain 0.0% and 0.08% (i.e., a control with no cationic organosilicon compound) by weight of 3-[Dimethoxy(2-hydroxyethoxy)silyl]propyl octadecyldimethyl ammonium chloride (42% solution in ethylene glycol). 5 parts of these compounded asphalt compositions were mixed with 100 parts Igneous aggregates. The mixtures were cured for 15 minutes at 135° C. and then allowed to cool to room temperature. The water immersion tests were conducted at 80° C. for 24 hours.

The results showed 98% retention of asphalt coating over the aggregates surface in the case of asphalt including the cationic organosilicon compound compared to less than 85% on the controlled sample (i.e., asphalt not including a cationic organosilicon compound).

Example-5

Paving grade asphalt (60/70 penetration at 25° C.) samples were prepared to contain 0.0% (i.e., a control with no cationic organosilicon compound) and 0.08% by weight of 3-[Dimethoxy(2-hydroxyethoxy)silyl]propyl-octadecyldimethyl ammonium chloride (42% solution in ethylene glycol). 3 parts of these compounded asphalt compositions were mixed with 100 parts Igneous aggregates. The aggregates were previously graded such that 100% passed a 20-mm standard sieve and 100% were retained on an 12-mm standard sieve. The mixtures were cured for 15 minutes at 135° C. and then allowed to cool to room temperature. The water immersion tests were conducted at 40° C. for five days. The results are given in Table 4.

TABLE 4

| | Days | | | | |
|---|---|---|---|---|---|
| | 1 | 2 | 3 | 4 | 5 |
| Adhesion % control (i.e., no organosilicon compound) | 92 | 70 | 60 | <60 | <60 |
| Adhesion % with Cationic organosilicon compound | 99 | 98 | 98 | 98 | 98 |

Again, adhesion percentage ratings below 95% after the immersion test are considered poor/failed.

Example-6

A paving grade asphalt (60/70 penetration at 25° C.) samples were prepared to contain 0.0% (i.e., a control with no cationic organosilicon compound) and 0.08% by weight of 3-[Dimethoxy(2-hydroxyethoxy)silyl]propyloctadecyldimethyl ammonium chloride (42% solution in ethylene glycol). 5 parts of these compounded asphalt compositions were mixed with 100 parts poor quality aggregates (these aggregates were not suitable for typical asphalt-concrete mixture because their water absorption was over 2%). The mixtures were cured for 15 minutes at 135° C. and then allowed to cool to room temperature. The water immersion tests were conducted at 40° C. for 24 hours.

The results showed that over 95% asphalt coating remained on the aggregate surface in the case of asphalt including the cationic organosilicon compound compared to less than 50% asphalt coating on the control asphalt composition that did not including a cationic organosilicon compound.

Example-7

A paving grade asphalt (60/70 penetration at 25° C.) samples were prepared to contain 0.0% (i.e., a control with no cationic organosilicon compound) and 0.08% by weight of 3-[Dimethoxy(2-hydroxyethoxy)silyl]propyl-octadecyldimethyl ammonium chloride (42% solution in ethylene glycol). 3 parts of these compounded asphalt compositions were mixed with 100 parts sand. The mixtures were cured for 15 minutes at 135° C. and then allowed to cool to room temperature. The water immersion tests were conducted at 40° C. for one day.

The results showed 95% retention of asphalt coating over the sand surface in the case of asphalt including the cationic organosilicon compound compared to less than 80% on the aggregate coated with the control asphalt composition that did not include a cationic organosilicon compound.

Example-8

Paving grade asphalt (60/70 penetration at 25° C.) samples were prepared to contain 0.0% (i.e., a control with no cationic organosilicon compound) and 0.1% by weight of 3-[Trimethoxysilyl]propyloctadecyldimethyl ammonium chloride (42% solution in methanol). 4.5 parts of these compounded asphalt compositions were mixed with 100 parts igneous aggregates. The particle size profile of the aggregate composition used for testing and evaluation was as follows: about 45% of the particles were less than 20-mm but greater than 10-mm; about 10% of the particles were less than 10-mm but greater than 6-mm; and about 45% of the particle were less than 6-mm. That is, 100% passed through a 20-mm screen, 45% was retained on a 10-mm screen, 10% retained on a 6 mm screen, and 45% went through the 6-mm screen. The mixtures were cured for 120 minutes at 135° C. as standard conditioning time and then allowed to cool to room temperature after which water boiling tests according to the ASTM D3625 procedures was conducted. The results are shown in Table 5.

TABLE 5

| Sample | 10 minutes | 1 Hour | 6 Hours |
|---|---|---|---|
| Adhesion % control (i.e., no organosilicon compound) | 40 | 10 | <5 |
| Adhesion % with Cationic organosilicon compound | 98 | 96 | 95 |

Figure 1A:
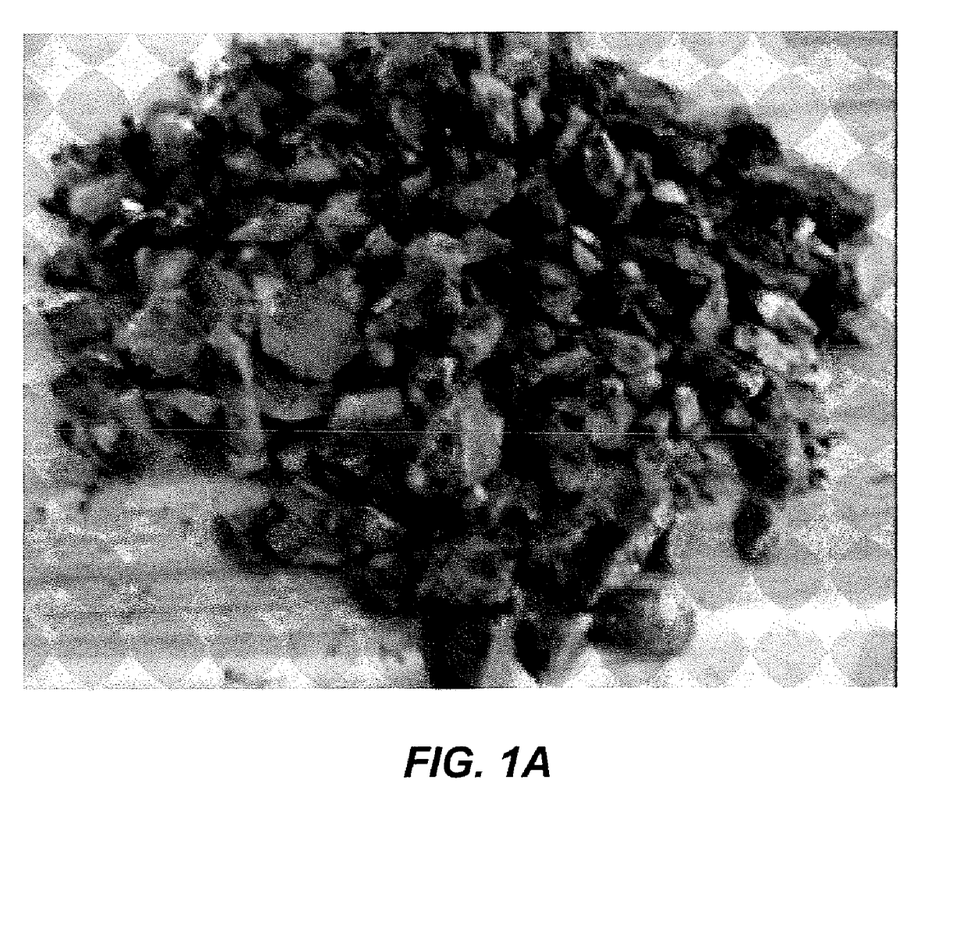
FIG. 1A shows the control sample of asphalt-concrete after a boiling test.
Figure 1B:
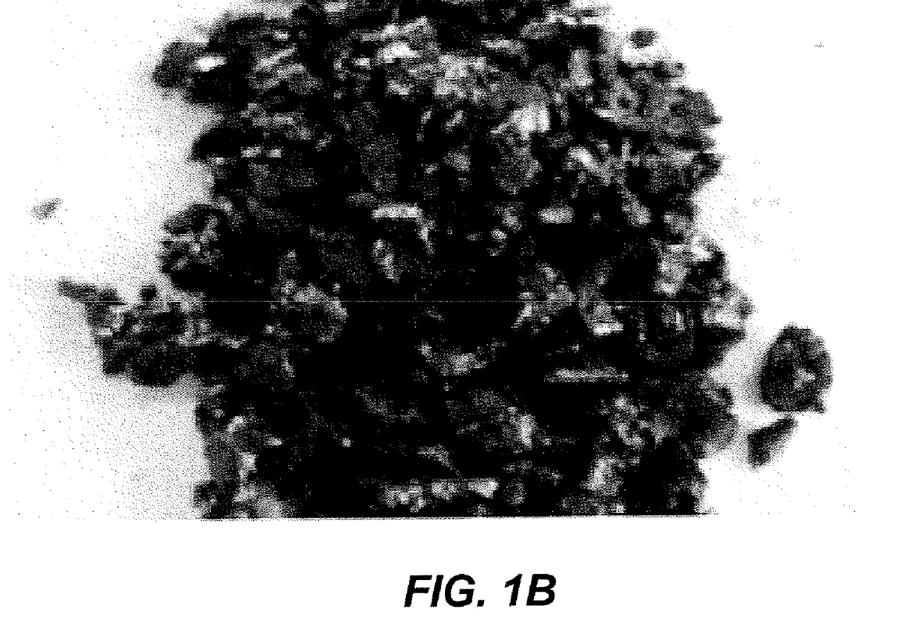
FIG. 1B shows a sample of asphalt-concrete having a cationic organosilicon compound according to one embodiment of the present invention after a boiling test.

The asphalt-concrete control sample after the boiling test is shown in FIG. 1A. The asphalt-concrete sample including and 0.1% by weight of 3-[Trimethoxysilyl]propyloctadecyldimethyl ammonium chloride (42% solution in methanol) after the boiling test is shown in FIG. 1B. Comparison of the FIGS. 1A and 1B illustrate that the inclusion of the cationic organosilicon resulting in significantly more asphalt being retained on the aggregate. That is, the control sample shown in FIG. 1A is dull and most of the asphalt has been removed from the aggregate. To the contrary, FIG. 1B illustrates that almost all of the asphalt is retained on the surface of the aggregate as evident by the shiny black appearance of the asphalt-concrete.

Figure 2A:
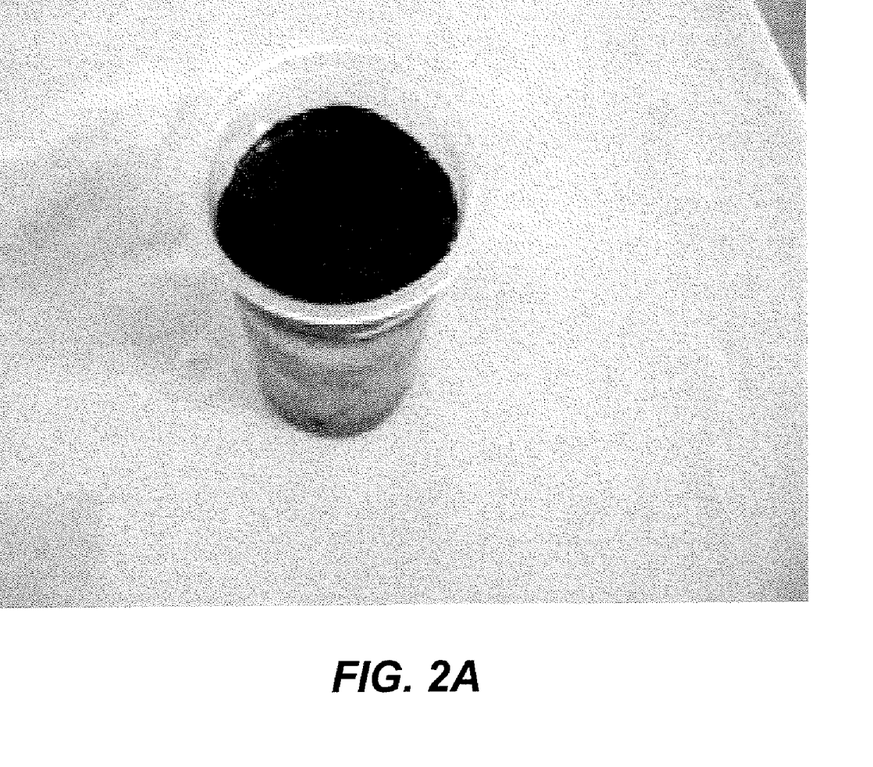
FIG. 2A shows the residual water from a control sample after a 6 hour boiling test.
Figure 2B:
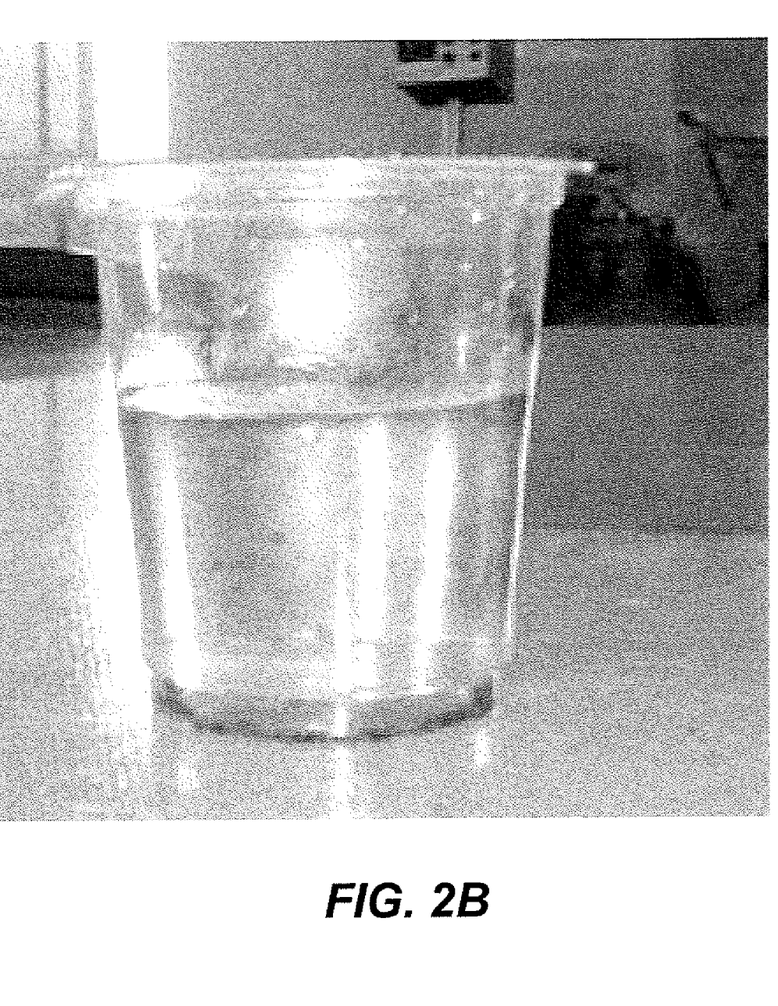
FIG. 2B shows the residual water from an asphalt-concrete sample having a cationic organosilicon compound according to one embodiment of the present invention after a 6 hour boiling test.

After the boiling tests, the residual water was removed and inspected for the presence of any stripped asphalt in the water. FIG. 2A shows the residual water of the control sample. As shown in FIG. 2A, the residual water of the control sample is dark (e.g., black) due the significant presence of asphalt stripped from the aggregate. FIG. 2B shows the residual water of the sample including the asphalt treated with the cationic organosilicon compound. As shown in FIG. 2B, the residual water is mostly transparent and contains significantly less asphalt stripped from the aggregate. These results show that organosilicon quaternary salt containing asphalt-concrete sample exhibited over 95% adhesion of asphalt on the aggregates mix while the control sample lost all or most asphalt from the aggregates (i.e., little to no adhesion to the aggregate).

Example-9

Asphalt Binder Penetration Index

Penetration index of the 80-100 and 60-70 grade asphalt binders were determined according to the ASTM D946-09 method: Standard Specification for Penetration-Graded Asphalt Cement for Use in Pavement Construction. The penetration values were obtained for the samples with 0.1% and 0.4% of 3-[Dimethoxy(2-hydroxyethoxy)silyl]propyl-octadecyldimethyl ammonium chloride (42% solution in ethylene glycol), and for a control sample without an organosilicon quaternary salt according to embodiments of the present invention. The results are given in Table 6.

TABLE 6

| Asphalt Penetration Grade | % organosilicon quaternary salt (42% in ethylene glycol) | Penetration Index |
|---|---|---|
| 80-100 | 0.0 | 86 |
| 80-100 | 0.1 | 67 |
| 60-70 | 0.0 | 67 |
| 60-70 | 0.1 | 65 |
| 60-70 | 0.4 | 61 |

These results illustrate that organosilicon quaternary salt addition (according to embodiments of the present invention) to asphalt helps to lower the penetration index which will result in improving stiffness and tensile strength of HMA (Hot Mix Asphalt).

Example-10

Stability of Asphalt Binder

Aged asphalt (60-70 penetration grade) samples with and without 0.1% 3-[Dimethoxy(2-hydroxyethoxy)silyl]propyl-octadecyldimethyl ammonium chloride (42% solution in ethylene glycol) were prepared by keeping the samples in an oven at 160° C. for 15 days. These heat aged asphalt samples were used in making HMA (Hot Mix Asphalt) samples, containing 5.1% asphalt using basalt aggregates, 33% passed through a 20-mm screen but retained on a 10-mm screen, 24% passed through a 10-mm but retained on a 6-mm screen, and 41% passed through a 6-mm screen. The controlled samples were prepared using the same grade asphalt without aging. Marshall Stability, stability ratio, and flow value were determined according to ASTM D1075/AASHTO T165 methodology: Standard Test Method for Effect of Water on Compressive Strength of Compacted Bituminous Mixtures. The results are summarized in the following Table 7.

TABLE 7

| Sample | Marshall Stability Dry Kg | Marshall Stability Wet Kg | Stability Ratio (%) Wet/Dry | Flow Value mm |
|---|---|---|---|---|
| 5.1% Asphalt HMA without Organosilicon quaternary salt; Controlled: non-aged | 1650 | 1260 | 76.3 | 2.78 |
| 5.1% Asphalt HMA with 0.1% Organosilicon quaternary salt; Controlled: non-aged | 2512 | 2461 | 97.9 | 2.95 |
| 5.1% Asphalt HMA with 0.1% Organosilicon quaternary salt; Aged | 2652 | 2445 | 92.2 | 3.4 |

These results clearly illustrate that organosilicon quaternary salt containing HMA according to embodiments of the present invention provide better stability ratio than without using an organosilicon quaternary salt according to embodiments of the present invention. These results also suggest that the 15 day aged samples containing an organosilicon quaternary salt according to embodiments of the present invention retained stability and flow value.

Example-11

Performance Grade Asphalt Binder

Asphalt binder tests were conducted using performance graded PG 64-22 asphalt binder with 0.0% (control), 0.05% and 0.1% 3-[Dimethoxy(2-hydroxyethoxy)silyl]propyloctadecyldimethyl ammonium chloride (42% solution in ethylene glycol). The asphalt binder was tested according to the AASHTO standard methods. The results are summarized in Table 8.

TABLE 8

| Binder: PG 64-22 with Organosilicon quaternary salt 42% in ethylene glycol (OSiQS) | | | |
|---|---|---|---|
| Rotational Viscosity @ 135° C., AASHTO T 316, PaS | | | Test Results |
| 0.1% Organosilicon quaternary salt (OSiQS) | | | 0.458 |
| 0.05% Organosilicon quaternary salt (OSiQS) | | | 0.468 |
| Control | | | 0.470 |
| | G*, kPa | Phase Angle | G*/sinδ, kPa |
| Dynamic Shear Rheometer AASHTO T 315 | | | |
| Test Temperature, 64° C. | | | |
| 0.1% OSiQS | 1.55 | 86.4 | 1.55 |
| 0.05% QSiQS | 1.56 | 86.4 | 1.57 |
| Control | 1.44 | 86.4 | 1.44 |
| Rolling Thin Film Oven Test (RTFOT) Aged Binder Dynamic Shear Rheometer AASHTO T 315 | | | |
| Test Temperature, 64° C. | | | |
| 0.1% OSiQS | 4.00 | 82.7 | 4.02 |
| 0.05% OSiQS | 3.75 | 82.8 | 3.78 |
| Control | 3.44 | 82.7 | 3.47 |
| Pressure Aging Vessel (PAV) Aged Binder, AASHTO R28 Pressure Aging Vassal (PVA) aged Binder Dynamic Shear Rheometer AASHTO T 315 | | | |
| Test Temperature, 25° C. | | | |
| 0.1% OSiQS | 6628 | 44.8 | 4668 |
| 0.05% OSiQS | 6001 | 44.1 | 4173 |
| Control | 6373 | 43.3 | 4368 |
| Bending Beam Rheometer (BBR) AASHTO T 313 | | | |
| | Stiffness, MPa | | m-value |
| Test Temperature, −12° C. | | | |
| 0.1% OSiQS | 186 | | 0.314 |
| 0.05% OSiQS | 202 | | 0.317 |
| Control | 201 | | 0.312 |
| PG Grade | | 64-22 | |

These results show that the rotational viscosities at 135° C. of the asphalt binder with the organosilicon quaternary salt are lower than that of normal asphalt binder. The lower viscosity at 135° C. is good for mixing and wetting of the aggregates with asphalt binder.

The results also show that the complex shearing modulus G*, is higher while the phase angle remained the same for the samples containing the organosilicon quaternary salt. This is a clear indication that addition of the organosilicon quaternary salt improves stiffness with the same viscoelastic response (phase angle).

The organosilicon quaternary salt containing asphalt binder's RFTOT residue also showed an increase in G* value with similar phase angle. These results suggest that organosilicon quaternary salt containing asphalt binders have improved oxidative stability during processing.

The PAV aged organosilicon quaternary salt containing asphalt binder residue had better stiffness with higher value of the phase angle. This also indicates that the organosilicon quaternary salt improves long term oxidative stability and maintains its viscoelastic response.

Bending beam Rheometer results show that the presence of the organosilicon quaternary salt in the asphalt binder reduced the stiffness at lower temperature. This will improve the low temperature fatigue resistance.

All these results clearly illustrate that the presence of the organosilicon quaternary salt according to embodiments of the present invention desirably improves the asphalt properties as compared to the original binder properties.

Example-12

Moisture Susceptibility Test (AASHTO T283)

Aggregates from two sources in Georgia (Lithonia and Lithia Springs) were selected for the mixture tests. Aggregate gradations with a nominal aggregate size of 12.5 mm were designed for testing and evaluation. Two sample of this mix design were made with the PG 64-22 binder with and without 3-[Dimethoxy(2-hydroxyethoxy)silyl]propyl-octadecyldimethyl ammonium chloride (42% solution in ethylene glycol) added to the asphalt binder. The asphalt and aggregate mixtures were compacted to 65 gyrations.

The evaluations of each mixture's moisture sensitivity were performed by measuring tensile strengths according to AASHTO T 283 method. Tensile strength ratios were calculated using tensile strength values of conditioned and unconditioned samples. A summary of those test results is shown in Tables 9 to 14.

TABLE 9

Luthenia Aggregates with PG 64-22 Asphalt binder (Control)

| Tensile Strength (PSI) Unconditioned | Tensile Strength (PSI) Unconditioned Average | Tensile Strength (PSI) Conditioned | Tensile Strength (PSI) Conditioned Average | Tensile Strength Ratio (TSR) |
|---|---|---|---|---|
| 195.17 | 188.08 | 133.78 | 160.32 | 0.85 |
| 188.87 | | 176.64 | | |
| 180.21 | | 170.56 | | |

TABLE 10

Luthenia Aggregates with PG 64-22 Asphalt binder, 0.05% 3-[Dimethoxy(2-hydroxyethoxy)silyl] propyl-octadecyldimethyl ammonium chloride (42% solution in ethyler glycol)

| Tensile Strength (PSI) Unconditioned | Tensile Strength (PSI) Unconditioned Average | Tensile Strength (PSI) Conditioned | Tensile Strength (PSI) Conditioned Average | Tensile Strength Ratio (TSR) |
|---|---|---|---|---|
| 165.05 | 158.21 | 143.29 | 150.08 | 0.95 |
| 153.64 | | 153.47 | | |
| 155.95 | | 153.47 | | |

TABLE 11

Luthenia Aggregates with PG 64-22 Asphalt binder 0.1% 3-[Dimethoxy(2-hydroxyethoxy)silyl]propyl-octadecyldimethyl ammonium chloride (42% solution in ethylene glycol)

| Tensile Strength (PSI) Unconditioned | Tensile Strength (PSI) Unconditioned Average | Tensile Strength (PSI) Conditioned | Tensile Strength (PSI) Conditioned Average | Tensile Strength Ratio (TSR) |
|---|---|---|---|---|
| 178.10 | 174.79 | 181.94 | 173.52 | 0.99 |
| 179.05 | | 171.13 | | |
| 167.22 | | 167.50 | | |

TABLE 12

Lithia Spring Aggregates with PG 64-22 Asphalt binder (Control)

| Tensile Strength (PSI) Unconditioned | Tensile Strength (PSI) Unconditioned Average | Tensile Strength (PSI) Conditioned | Tensile Strength (PSI) Conditioned Average | Tensile Strength Ratio (TSR) |
|---|---|---|---|---|
| 182.43 | 165.87 | 131.46 | 135.59 | 0.82 |
| 153.47 | | 130.56 | | |
| 161.72 | | 144.78 | | |

TABLE 13

Lithia Spring Aggregates with PG 64-22 Asphalt binder 0.05% 3-[Dimethoxy(2-hydroxyethoxy)silyl]propyl-octadecyldimethyl ammonium chloride (42% solution in ethylene glycol)

| Tensile Strength (PSI) Unconditioned | Tensile Strength (PSI) Unconditioned Average | Tensile Strength (PSI) Conditioned | Tensile Strength (PSI) Conditioned Average | Tensile Strength Ratio (TSR) |
|---|---|---|---|---|
| 170.39 | 159.99 | 154.79 | 151.56 | 0.95 |
| 159.41 | | 155.95 | | |
| 150.17 | | 144.20 | | |

TABLE 14

Lithis Spring Aggregates with PG 64-22 Asphalt binder 0.1% 3-[Dimethoxy(2-hydroxyethoxy)silyl]propyl-octadecyldimethyl ammonium chloride (42% solution in ethylene glycol)

| Tensile Strength (PSI) Unconditioned | Tensile Strength (PSI) Unconditioned Average | Tensile Strength (PSI) Conditioned | Tensile Strength (PSI) Conditioned Average | TSR |
|---|---|---|---|---|
| 155.95 | 167.55 | 164.61 | 167.40 | 1.00 |
| 170.84 | | 172.98 | | |
| 175.87 | | 16461 | | |

The TSR values of the Lithonia 0.05% organosilicon quaternary salt and the Lithia Springs 0.05% organosilicon quaternary salt were 0.95 each, while those of the control mixtures were 0.85 and 0.82, respectively. The mixtures with 0.1% organosilicon quaternary salt showed the TSR values of 0.99 and 1.00, illustrating that the organosilicon quaternary salt had significantly improved the moisture resistance of the HMA mixtures.

Example-13

Cold Mix Asphalt Composition 500 g of mix basalt aggregates having a particle size distribution as follows: 33% passed through a 20-mm screen but retained on a 10-mm screen, 24% passed through a 10-mm screen but retained on a 6-mm screen, and 41% passed through a 6-mm screen. The 500 g of mix basalt aggregates was used for making cold mix asphalt. The control sample was prepared by mixing aggregates with 58.3 g rapid setting grade asphalt emulsion (containing 60% solids) by manual mixing.

The rapid setting asphalt emulsion was mixed with 0.034 g organosilicon quaternary salt, 3-[Dimethoxy(2-hydroxyethoxy)silyl]propyloctadecyldimethyl ammonium chloride (42% solution in ethylene glycol) dissolved in 0.306 g of water. The cold mix asphalt composition was prepared as described above.

Both samples were dried for 48 hours in open air (atmospheric condition, temperatures range 25° C. to 40° C.). The samples were evaluated using ASTM D3625 method: Standard Practice for Effect of Water on Bituminous-Coated Aggregate Using Boiling Water. The results are summarized in Table 15.

TABLE 15

| Sample | Boiling Test Period (minutes) | Remaining Asphalt coverage (%) |
|---|---|---|
| Control | 10 | 70 |
| Organosilicon Quaternary salt containing | 10 | 98 |

Figure 3A:
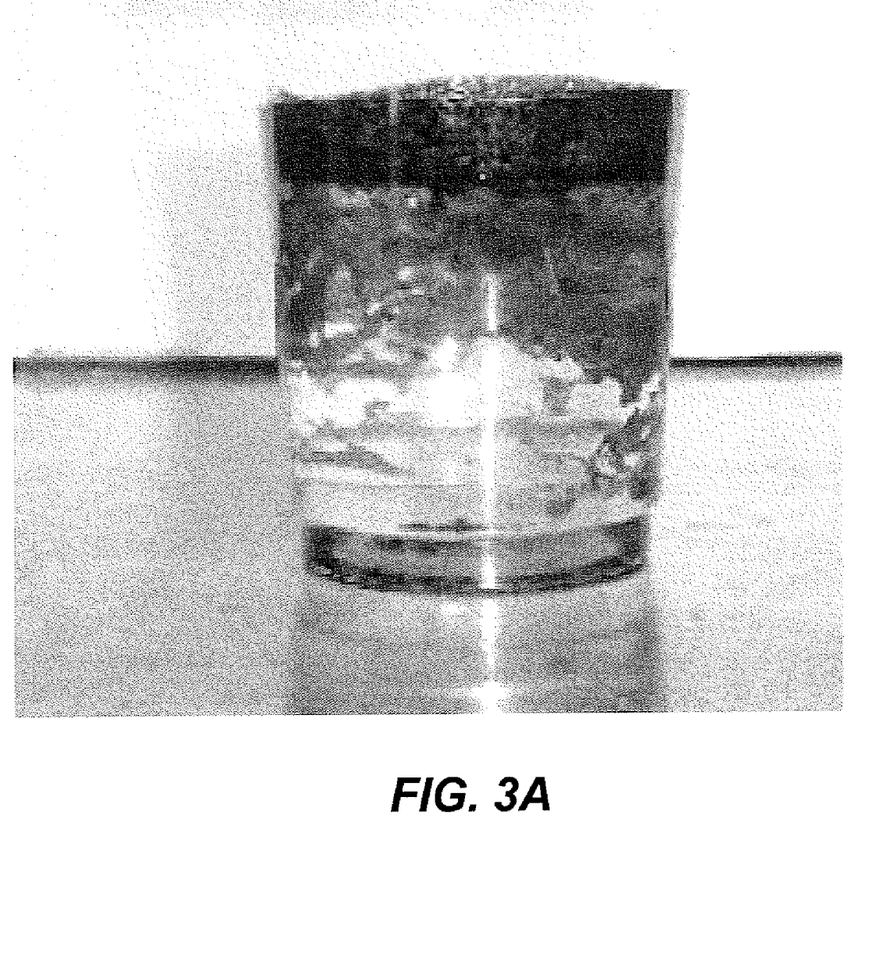
FIG. 3A shows the residual water from a control sample after a boiling test.
Figure 3B:
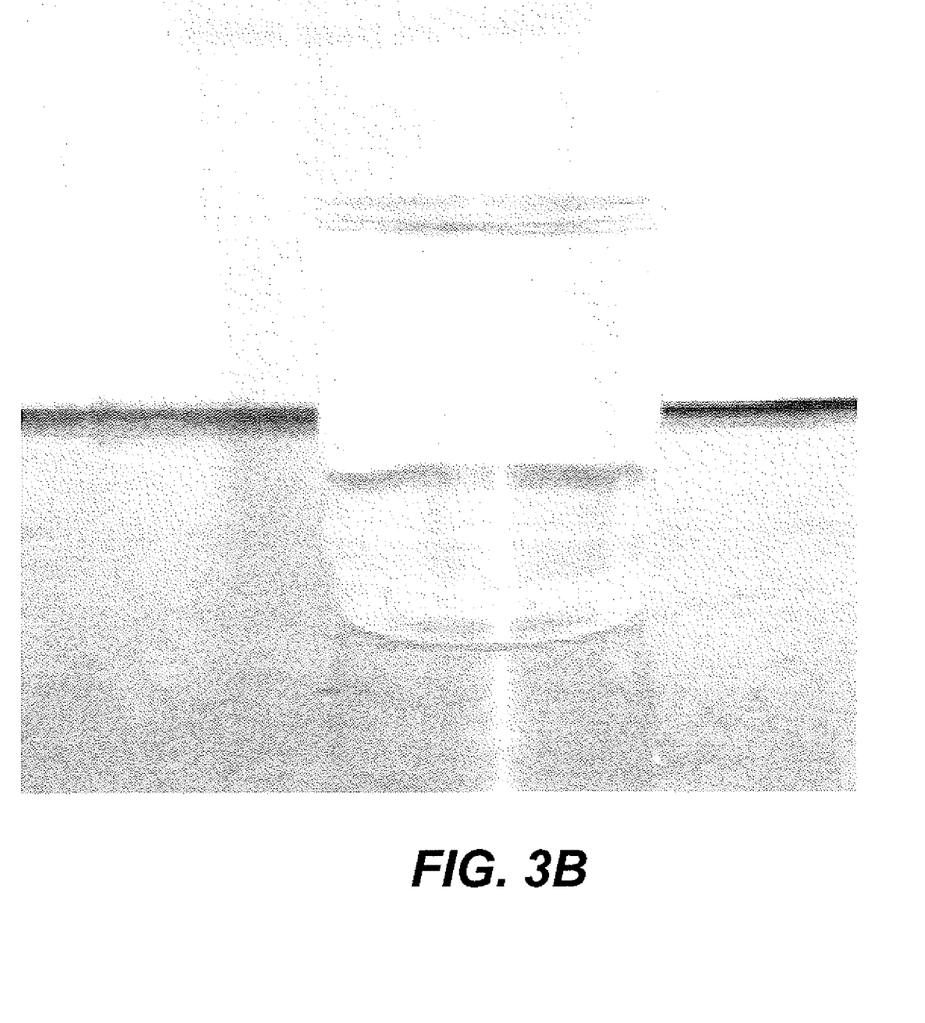
FIG. 3B shows the residual water from an asphalt-concrete sample having a cationic organosilicon compound according to one embodiment of the present invention after a boiling test.

After the boiling tests, the residual water was removed and inspected for the presence of any stripped asphalt in the water. FIG. 3A shows the residual water of the control sample. As shown in FIG. 3A, the residual water of the control sample includes a large layer of dark (e.g., black) asphalt that was stripped from the aggregate. FIG. 3B shows the residual water of the sample including the asphalt treated with the cationic organosilicon compound. As shown in FIG. 3B, the residual water is transparent and no stripped asphalt can be seen from a visual inspection. These results clearly illustrate that the sample containing the organosilicon quaternary salt showed improved bonding of the asphalt to the aggregate. For instance, the control sample exhibited about a 30% stripping (e.g., about 30% of the asphalt was stripped from the aggregate) while the sample containing organosilicon quaternary salt exhibited about a 2% stripping level (e.g., about 2% of the asphalt was stripped from the aggregate) upon visual observation according to standard practice in the field.

Many modifications and other embodiments of the inventions set forth herein will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An asphalt-mineral composition, comprising:
   (a) 100 parts by weight of a mineral aggregate; and
   (b) 3 to 20 parts by weight of an asphalt comprising from 0.001 to 5% by weight of at least one cationic organosilicon compound on the weight of the asphalt.

2. The composition of claim 1, wherein the at least one cationic organosilicon compound is selected from the formula:

$$Y_{3-a}Si(R^1{}_a)R^2N^+R^3R^4R^5X^-,$$

wherein
Y is independently selected from a group consisting of OR, $O(CH_2CH_2O)_nH$, $(CH_3OCH_2CH_2O)$, and $(CH_3CH_2OCH_2CH_2O)$;
a has a value selected from 0, 1 or 2;
n is a value from 1 to 10;
R is a C1-C4 alkyl;
$R^1$ is either methyl or ethyl;
$R^2$ is a C1-C4 alkylene group;
$R^3$, $R^4$ and $R^5$ are each independently selected from a group consisting of C1-C22 alkyl wherein at least one such group has more than 8 C-atoms, $-CH_2C_6H_5$, $-CH_2CH_2OH$, $-CH_2OH$ and $-(CH_2)_yNHC(O)R^6$ wherein y has a value of from 2 to 10 and $R^6$ is a C1-C12 perfluoroalkyl radical; and
X is chloride, bromide, fluoride, iodide, acetate or tosylate.

3. The composition of claim 1, wherein $R^2$ is a C4-alkylene group.

4. The composition of claim 1, wherein said asphalt comprises between about 0.01 to about 3 weight percent of at least one cationic organosilicon compound.

5. The composition of claim 1, wherein the cationic organosilicon compound is at least one selected from 3-(trimethoxysilyl)propyldimethyloctadecyl ammonium chloride, 3-(trimethoxysilyl)propylmethyldidecyl ammonium chloride, 3-(trimethoxysilyl)propyldimethylhexadecyl ammonium chloride, and 3-[Dimethoxy(2-hydroxyethoxy)silyl] propyloctadecyldimethyl ammonium chloride.

6. An asphalt composition comprising: an asphalt comprising from 0.001 to 5% by weight of at least one cationic organosilicon compound on the weight of the asphalt.

7. The composition of claim 6, wherein the at least one cationic organosilicon compound is selected from the formula:

$$Y_{3-a}Si(R^1{}_a)R^2N^+R^3R^4R^5X^-,$$

wherein
Y is independently selected from a group consisting of OR, $O(CH_2CH_2O)_nH$, $(CH_3OCH_2CH_2O)$, and $(CH_3CH_2OCH_2CH_2O)$;
a has a value selected from 0, 1 or 2;
n is a value from 1 to 10;
R is a C1-C4 alkyl;
$R^1$ is either methyl or ethyl;
$R^2$ is a C1-C4 alkylene group;
$R^3$, $R^4$ and $R^5$ are each independently selected from a group consisting of C1-C22 alkyl wherein at least one such group has more than 8 C-atoms, $-CH_2C_6H_5$, $-CH_2CH_2OH$, $-CH_2OH$ and $-(CH_2)_yNHC(O)R^6$ wherein y has a value of from 2 to 10 and $R^6$ is a C1-C12 perfluoroalkyl radical; and
X is chloride, bromide, fluoride, iodide, acetate or tosylate.

8. A water-based asphalt composition comprising:
   (a) an emulsion comprising asphalt dispersed in water; and
   (b) from 0.001 to 5% by weight of at least one cationic organosilicon compound on the weight of the asphalt.

9. The composition as claimed in claim 8, wherein the at least one cationic organosilicon compound is selected from the formula:

$$Y_{3-a}Si(R^1{}_a)R^2N^+R^3R^4R^5X^-,$$

wherein
in each formula
Y is independently selected from a group consisting of OR, $O(CH_2CH_2O)_nH$, $(CH_3OCH_2CH_2O)$, and $(CH_3CH_2OCH_2CH_2O)$;
a has a value selected from 0, 1 or 2;
n is a value from 1 to 10;

R is a C1-C4 alkyl;
R$^1$ is either methyl or ethyl;
R$^2$ is a C1-C4 alkylene group;
R$^3$, R$^4$ and R$^5$ are each independently selected from a group consisting of C1-C22 alkyl wherein at least one such group has more than 8 C-atoms, —CH$_2$C$_6$H$_5$, —CH$_2$CH$_2$OH, —CH$_2$OH and —(CH$_2$)$_y$NHC(O)R$^6$ wherein y has a value of from 2 to 10 and R$^6$ is a C1-C12 perfluoroalkyl radical; and X is chloride, bromide, fluoride, iodide, acetate or tosylate.

10. A water-based asphalt-mineral composition comprising:
(a) an emulsion comprising asphalt dispersed in water;
(b) mineral aggregate; and
(c) 0.001 to 5% by weight of at least one cationic organosilicon compound on the weight of the asphalt.

11. The composition as claimed in claim 10, wherein the at least one cationic organosilicon compound is selected from the formula:

$$Y_{3-a}Si(R^1{}_a)R^2N^+R^3R^4R^5X^-,$$

wherein
Y is independently selected from a group consisting of OR, O(CH$_2$CH$_2$O)$_n$H, (CH$_3$OCH$_2$CH$_2$O), and (CH$_3$CH$_2$OCH$_2$CH$_2$O);
a has a value selected from 0, 1 or 2;
n is a value from 1 to 10;
R is a C$_1$-C$_4$ alkyl;
R$^1$ is either methyl or ethyl;
R$^2$ is a C1-C4 alkylene group;
R$^3$, R$^4$ and R$^5$ are each independently selected from a group consisting of C1-C22 alkyl wherein at least one such group has more than 8 C-atoms, —CH$_2$C$_6$H$_5$, —CH$_2$CH$_2$OH, —CH$_2$OH and —(CH$_2$)$_y$NHC(O)R6 wherein y has a value of from 2 to 10 and R6 is a C1-C12 perfluoroalkyl radical; and X is chloride, bromide, fluoride, iodide, acetate or tosylate.

12. An asphalt membrane comprising:
(a) asphalt;
(b) mineral filler; and
(c) from 0.001 to 5% by weight of at least one cationic organosilicon compound on the weight of the asphalt.

13. The membrane as claimed in claim 12, wherein the at least one cationic organosilicon compound is selected from the formula:

$$Y_{3-a}Si(R^1{}_a)R^2N^+R^3R^4R^5X^-,$$

wherein
Y is independently selected from a group consisting of OR, O(CH$_2$CH$_2$O)$_n$H, (CH$_3$OCH$_2$CH$_2$O), and (CH$_3$CH$_2$OCH$_2$CH$_2$O);
a has a value selected from 0, 1 or 2;
n is a value from 1 to 10;
R is a C1-C4 alkyl;
R$^1$ is either methyl or ethyl;
R$^2$ is a C1-C4 alkylene group;
R$^3$, R$^4$ and R$^5$ are each independently selected from a group consisting of C1-C22 alkyl wherein at least one such group has more than 8 C-atoms, —CH$_2$C$_6$H$_5$, —CH$_2$CH$_2$OH, —CH$_2$OH and —(CH$_2$)$_y$NHC(O)R$^6$ wherein y has a value of from 2 to 10 and R$^6$ is a C1-C12 perfluoroalkyl radical; and X is chloride, bromide, fluoride, iodide, acetate or tosylate.

14. A composition used for asphalt roofing systems, comprising:
(a) asphalt;
(b) mineral filler;
(c) a fibre reinforcement mat; and
(d) from 0.001 to 5% by weight of at least one cationic organosilicon compound on the weight of the asphalt.

15. The composition as claimed in claim 14, wherein the at least one cationic organosilicon compound is selected from the formula:

$$Y_{3-a}Si(R^1{}_a)R^2N^+R^3R^4R^5X^-,$$

wherein
Y is independently selected from a group consisting of OR, O(CH$_2$CH$_2$O)$_n$H, (CH$_3$OCH$_2$CH$_2$O), and (CH$_3$CH$_2$OCH$_2$CH$_2$O);
a has a value selected from 0, 1 or 2;
n is a value from 1 to 10;
R is a C1-C4 alkyl;
R$_1$ is either methyl or ethyl;
R$_2$ is a C1-C4 alkylene group;
R$_3$, R$_4$ and R$_5$ are each independently selected from a group consisting of C1-C22 alkyl wherein at least one such group has more than 8 C-atoms, —CH$_2$C$_6$H$_5$, —CH$_2$CH$_2$OH, —CH$_2$OH and —(CH$_2$)$_y$NHC(O)R$^6$ wherein y has a value of from 2 to 10 and R$^6$ is a C1-C12 perfluoroalkyl radical; and X is chloride, bromide, fluoride, iodide, acetate or tosylate.

* * * * *

UNITED STATES PATENT AND TRADEMARK OFFICE
CERTIFICATE OF CORRECTION

PATENT NO. : 8,349,065 B2  
APPLICATION NO. : 12/638596  
DATED : January 8, 2013  
INVENTOR(S) : Ranka et al.

Page 1 of 1

It is certified that error appears in the above-identified patent and that said Letters Patent is hereby corrected as shown below:

On the Title page,  
Insert the following:  
Item --(30) Foreign Application Priority Data  
Dec. 9, 2009 (IN) .......................PCT/IN2009/000712  
Dec. 9, 2008 (IN) .......................2657/MUM/2008--.

In the Claims:

Column 19,  
Line 67, Claim 2, cancel the formula and replace with "$Y_{3-a}Si(R^1_a)R^2N^+R^3R^4R^5X^-$".

Column 20,  
Line 17, Claim 3, "claim 1" should read --claim 2--;  
Line 36, Claim 7, and line 61, Claim 9, cancel the formula and replace with "$Y_{3-a}Si(R^1_a)R^2N^+R^3R^4R^5X^-$";  
Line 62, Claim 9, "whereinin" should read --wherein--.

Column 22,  
Line 27, Claim 15, cancel the formula and replace with "$Y_{3-a}Si(R^1_a)R^2N^+R^3R^4R^5X^-$".

Signed and Sealed this  
Third Day of September, 2013

Teresa Stanek Rea  
*Acting Director of the United States Patent and Trademark Office*